United States Patent
Itabashi et al.

(10) Patent No.: US 6,239,439 B1
(45) Date of Patent: May 29, 2001

(54) RADIATION DETECTING DEVICE AND RADIATION DETECTING METHOD

(75) Inventors: Satoshi Itabashi, Chigasaki; Tadao Endo, Atsugi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,476

(22) Filed: Nov. 23, 1998

(30) Foreign Application Priority Data

Nov. 28, 1997 (JP) .................................... 9-328618

(51) Int. Cl.$^7$ ..................................... G01T 1/24
(52) U.S. Cl. .................. 250/370.11; 250/370.09
(58) Field of Search ............... 250/370.09, 370.11

(56) References Cited

U.S. PATENT DOCUMENTS

| | | | |
|---|---|---|---|
| 4,689,487 | 8/1987 | Nishiki et al. | 250/361 R |
| 5,262,649 | 11/1993 | Antonuk et al. | 250/370.09 |
| 5,331,682 | 7/1994 | Hsieh | 378/19 |
| 5,517,544 | * 5/1996 | Levinson | 378/4 |
| 5,644,610 | * 7/1997 | Crawford et al. | 378/19 |
| 5,818,898 | * 10/1998 | Tsukamoto et al. | 378/98.8 |
| 5,965,872 | * 10/1999 | Endo et al. | 250/208.1 |

FOREIGN PATENT DOCUMENTS

| | | |
|---|---|---|
| 5-237091 | 9/1993 | (JP) . |
| 7-502865 | 3/1995 | (JP) . |
| 93/14418 | 7/1993 | (WO) . |
| 95/18390 | 7/1995 | (WO) . |
| 96/34416 | 10/1996 | (WO) . |

* cited by examiner

*Primary Examiner*—Constantine Hannaher
(74) *Attorney, Agent, or Firm*—Fitzpatrick, Cella, Harper & Scinto

(57) ABSTRACT

A radiation detecting device having a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the detecting device comprises a means for turning on the TFT to be turned on first among the TFTs for transfer after the delay of at least $(n \times \tau_1)$, wherein $\tau_1$ is a time constant of a characteristic of the wavelength converter, and n is ln(SN) in which SN is a desired signal to noise ratio, after the irradiation is stopped, thereby transferring a signal stored in its corresponding pixel.

28 Claims, 8 Drawing Sheets

TIME AFTER REMOVING STIMULATION/ms

WHEREIN $SN_2$ IS APPROXIMATED AS $SN_2 = \dfrac{1-e^{-\beta}}{e^{-\beta}} \approx \dfrac{1}{e^{-\beta}} = e^{\beta}$.

RADIATION DETECTING DEVICE AND RADIATION DETECTING METHOD

BACKGROUND OF THE INVENTION

1. Field of the Invention

The present invention relates to a radiation detecting device and a radiation detecting method, and more particularly to a radiation detecting device and a radiation detecting method which are suitable for use in detecting information such as images by converting the wavelength of radiation including X-rays by means of a wavelength converter typified by a scintillator (or phosphor) into a wavelength in a wavelength region detectable by a sensor element.

2. Related Background Art

When radiation such as an X-ray is detected directly by a photosensor in radiation diagnostic apparatus and X-ray photographic apparatus making use of an X-ray or the like, the efficiency of such an apparatus becomes poor because there is no photosensor having high sensitivity to the radiation. It is therefore considered to use a scintillator capable of converting the radiation into visible light and a photosensor in combination.

As the characteristics of the scintillator, there are characteristics called the afterglow characteristics of a luminescent screen. It is indicated that the light emission of a scintillator, which is attendant on radiation exposure, is caused and attenuated in a certain functional relation as illustrated in FIG. 1, and a slow component has a time constant as long as several hundreds milliseconds. In order to correct the attenuation of afterglow as a countermeasure thereof, in U.S. Pat. No. 5,331,682 by way of example, a great number of signal samples are detected to calculate out a compensation value by complicated calculation, and the compensation value is subtracted from the signals. In addition, for this calculation, delay is caused until the initial attenuation component can be neglected.

On the other hand, it is proposed in, for example, U.S. Pat. No. 5,262,649 to use a photosensor composed of thin film semiconductors in combination with a scintillator for X-ray photographic apparatus and radiation diagnostic apparatus making use of an X-ray or the like. In this publication, a relationship among the time constant according to the sensor composed of the thin film semiconductor, and a transistor, the read rate of the apparatus, and an S/N (signal/noise) ratio is described. In U.S. Pat. No. 5,262,649, there are introduced a reading method of a fluoroscopic mode in which an X-ray is continuously emitted, and a photographic mode in which an X-ray is emitted only for a short period of time, and all the sensors store signals at the same time.

However, in order to detect a great number of signals to calculate out a compensation value, and to make the calculation that the compensation value is subtracted from the signals as described in, for example, U.S. Pat. No. 5,331,682, expensive signal processing circuit and arithmetic unit are required. In addition, since delay is caused until the initial attenuation component can be neglected, the fetch of signals from a detector requires to wait by the delay time.

In U.S. Pat. No. 5,262,649, the fluoroscopic mode in which an X-ray is continuously emitted, and the photographic mode in which an X-ray is emitted only for a short period of time are introduced. In the photographic mode, no time constant of the light emission and attenuation of the scintillator is considered. Therefore, when reading is started in a moment after the irradiation with the X-ray is completed, due to the time constant of the light attenuation of the scintillator, a signal is read out in the initial line of the reading while a dark current is high, and a signal with a dark current component integrated is read out in a reading line on the last side. Therefore, the dark current mixed into the signal due to the delayed attenuation characteristics of the scintillator greatly varies according to the reading order of the line.

In U.S. Pat. No. 5,262,649, there is introduced an X-ray diagnostic apparatus or radiation therapeutic apparatus using a large screen sensor panel comprised of sensors composed of a-Si:H (amorphous silicon hydride) and thin film transistors, and a relationship among a time constant obtained by multiplying the capacity of the sensor by the ON resistance of the thin film transistor, an S/N ratio and a frame frequency is derived, which is required as a real-time image sensor. However, this relationship is on the assumption that an X-ray is continuously emitted, and such attenuation characteristics of the scintillator as described above are not referred to. This publication does also not refer to the design of reading when an X-ray is intermittently emitted.

The attenuation characteristics of the scintillator do not become a considerable problem in the case of the photographic mode or the like because there is sufficient time. In the case of a full moving image having many frames as in the diagnosis of the circulatory organ system, however, it is considered that the residual component of light may exert an influence as noise.

In such a case, however, it is not proposed to make a design by combining the attenuation characteristics of the scintillator with the reading characteristics of the time constant composed of the capacity of the sensor and the ON resistor of the thin film transistor in the sensor panel in such a case.

SUMMARY OF THE INVENTION

It is an object of the present invention to read out signals of a desired S/N ratio, which are reduced in noise and narrowed in scattering, by adopting a reading method taking the attenuation characteristics of a scintillator into consideration in a radiation detecting device for a radiation diagnostic apparatus or the like which is capable of reducing an exposed dose by intermittent exposure to radiation such as X-rays.

Another object of the present invention is to derive a relationship for obtaining an optimum signal to noise (S/N) ratio taking the attenuation characteristics of a scintillator into consideration in the inspection, diagnosis and therapy with radiation continuously emitted.

The above objects can be achieved by the present invention described below.

According to the present invention, there is thus provided a radiation detecting device having a wavelength converter for converting radiation into photoelectrically convertible light and a plurality of pixels arranged in the form of a matrix which pixel comprises a sensor element for convertig the light into an electric signal and a thin film transistor (TFT) for transfer connected to the sensor element to successively transfer a signal from the pixel, the detecting device comprising:

a means for turning on the TFT to be turned on among of the TFTs for transfer after the delay of at least $(n \times \tau_1)$, wherein $\tau_1$ is a time constant of a characteristic of the wavelength converter, and n is ln(SN) in which SN is a desired signal to noise ratio, after the irradiation is stopped, thereby transferring a signal stored in its corresponding pixel.

According to the present invention, there is also provided a radiation detecting device comprising a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, wherein the detecting device satisfies the following relational expressions:

$$(\alpha \times \tau_1 + \beta \times \tau_2) \leq 1/FPS; \text{ and}$$

$$SN = exp(\alpha + \beta)$$

wherein SN is the desired signal to noise ratio of the whole device, FPS is the number of frames per second upon the reading of the radiation detecting device, or a reciprocal of the time required for a reading; $\tau_1$ is a time constant of build up and attenuation of the wavelength converter; $\tau_2$ is a time constant obtained by multiplying the capacity of the sensor element by the ON resistance of the TFT for transfer; $\alpha$ is a multiple of [(storage time of the light signal in the sensor element)/$\tau_1$], or $\ln(SN_1)$ in which $SN_1$ is a signal to noise ratio required of the wavelength converter; and $\beta$ is a multiple of a time constant of the time the TFT for transfer is turned on, or $\ln(SN_2)$ in which $SN_2$ is a signal to noise ratio required of the TFT for transferring the signal stored in the capacitor of the sensor element.

According to the present invention, there is further provided a radiation detecting method using a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the method comprising:

turning on the TFT to be turned on first among the TFTs for transfer after the delay of at least $(n \times \tau_1)$, wherein $\tau_1$ is a time constant of a characteristic of the wavelength converter, and n is $\ln(SN)$ in which SN is a desired signal to noise ratio, after the irradiation is stopped, thereby transferring a signal stored in its corresponding pixel.

According to the present invention, there is still further provided a radiation detecting method using a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the method comprising satisfying the following relational expressions:

$$(\alpha \times \tau_1 + \beta \tau_2) \leq 1/FPS; \text{ and}$$

$$SN = exp(\alpha + \beta)$$

wherein SN is the desired signal to noise ratio of the whole device; FPS is the number of frames per second upon the reading of a radiation detecting device, or a reciprocal of the time required for a reading; $\tau_1$ is a time constant of build up and attenuation of the wavelength converter; $\tau_2$ is a time constant obtained by multiplying the capacity of the sensor element by the ON resistance of the TFT for transfer; $\alpha$ is a multiple of [(storage time of the light signal in the sensor element)/$\tau_1$], or $\ln(SN_1)$ in which $SN_1$ is a signal to noise ratio required of the wavelength converter; and $\beta$ is a multiple of a time constant of the time the TFT for transfer is turned on, or $\ln(SN_2)$ in which $SN_2$ is a signal to noise ratio required of the TFT for transferring the signal stored in the capacitor of the sensor element.

DESCRIPTION OF THE PREFERRED EMBODIMENTS

Figure 1:
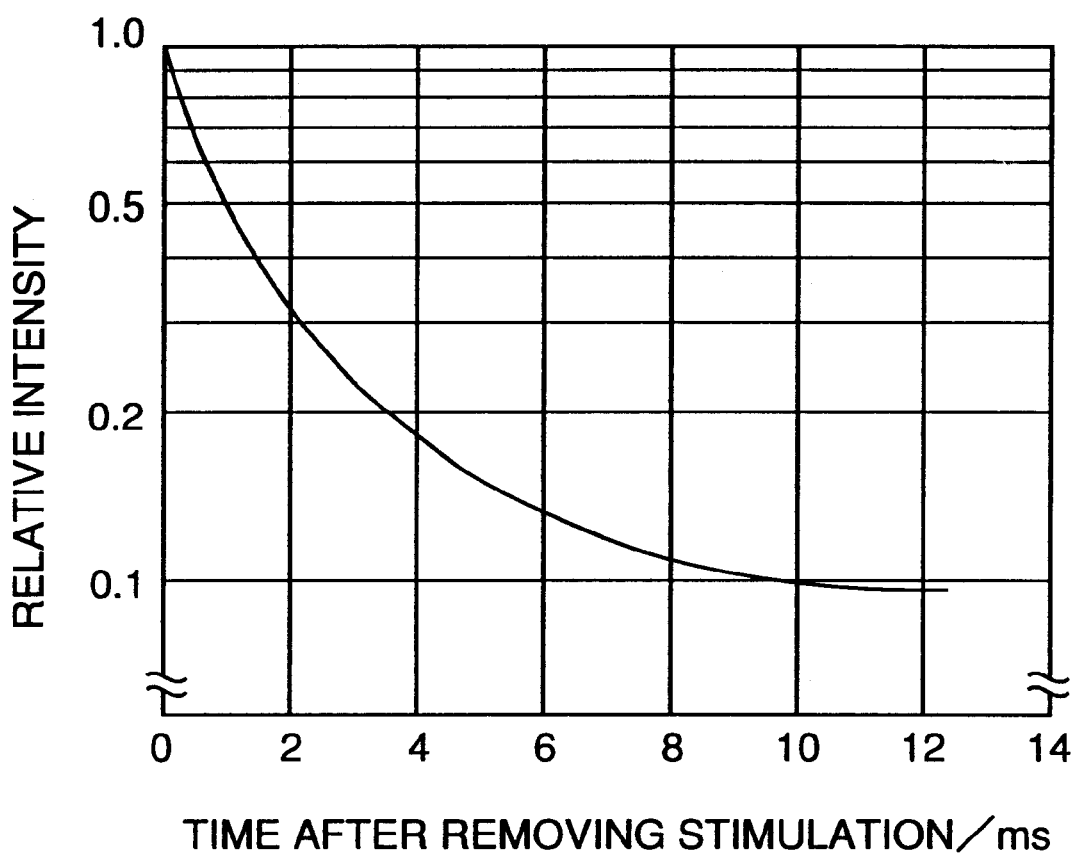
FIG. 1 diagrammatically illustrates an example of the afterglow characteristics of a scintillator.

The present invention achieves the reading of information with higher precision and stability by taking the time characteristics related to the wavelength conversion of a wavelength converter such as a scintillator into consideration.

More specifically, according to the present invention, in a radiation detecting device or method used in photographing using radiation emitted at a prescribed pulse duration, the detecting device comprises a wavelength converter for subjecting the radiation to wavelength conversion (for example, a scintillator which converts the radiation into a radiant ray having a wavelength in a visible region, and has a time constant of the afterglow characteristics of a luminescent screen) and a photoelectrical conversion circuit part comprised of pixels arranged in the form of a matrix and being driven by turning on the thin film transistors (TFTs for transfer) every at least one column prescribed, which pixel is comprised of a thin film sensor element having a prescribed capacity and a thin film transistor (TFT for transfer) having a prescribed ON resistance and connected to the respective thin film sensor elements; and the radiation detecting method uses these respective parts, wherein the detecting device or method is adapted to turn on the thin film transistors after the delay of at least $(n \times \tau_1)$ [$\tau_1$ being a time constant of the characteristics of the wavelength converter (the afterglow characteristics of a luminescent screen of the scintillator)], after the irradiation is stopped, thereby transferring signals stored in their corresponding thin film sensor elements, the above objects can be achieved by designing a system so as to satisfy the following relationship:

$$n = \ln(SN);$$

$$n \times \tau_1 = \ln(SN) \times \tau_1$$

wherein SN is a signal to noise ratio required of the system.

According to the present invention, in a radiation detecting device or method used in radiophotographing, radiation diagnostic apparatus or radiation therapeutic apparatus using radiation, the detecting device comprises a wavelength converter for subjecting the radiation to wavelength conversion (for example, a scintillator which converts the radiation into a radiant ray having a wavelength in a visible region, and has a time constant of the afterglow characteristics of a luminescent screen); and a photoelectrical conversion circuit part comprised of pixels arranged in the form of a matrix and being driven by turning on the thin film transistors every at least one column prescribed, which pixel is comprised of a thin film sensor element having a prescribed capacity and a thin film transistor having a prescribed ON resistance and connected to the respective thin film sensor elements; and the radiation detecting method uses these respective parts, a desired signal to noise ratio (SN) required of the system can be obtained by satisfying the following relational expressions:

$$(\alpha \times \tau_1 + \beta \times \tau_2) \leq 1/FPS;$$

$$SN = exp(\alpha + \beta); \text{ and}$$

$$1/SN = exp(-\alpha - \beta)$$

wherein $\tau_1$ is a time constant of the characteristics of the wavelength converter (the build up and attenuation of light emission of the scintillator); $\tau_2$ is a time constant obtained by multiplying the capacity C of the thin film sensor element by the ON resistance R of the thin film transistor; FPS is the number of frames per second upon the reading of the radiation detecting device, or a reciprocal of the time required for a reading; α is a multiple of [(storage time of the light signal in the sensor)/(the time constant $\tau_1$ of build up and attenuation of light emission of the scintillator)], or ln($SN_1$) in which $SN_1$ is a signal to noise ratio required of the wavelength converter (scintillator); and β is a multiple of a time constant of the time the thin film transistor (TFT) is turned on, or ln($SN_2$) in which $SN_2$ is a signal to noise ratio required of the TFT for transferring the signal stored in the capacitor of the thin film sensor element, whereby the above objects can be achieved.

According to the present invention, as described above, signals of a desired S/N ratio, which are reduced in noise and narrowed in scattering, can be read out by adopting the reading method taking the characteristics of the wavelength converter such as the attenuation characteristics of a scintillator into consideration, which enables us to reduce an exposed dose by intermittent exposure to radiation, or X-rays.

In addition, a radiation detecting device having the desired S/N ratio can be designed with ease by deriving the relationship for obtaining an optimum signal to noise (S/N) ratio taking the attenuation characteristics of a scintillator into consideration in the inspection, diagnosis and therapy with radiation continuously emitted.

According to the present invention, for example, a radiation detecting device comprising a large screen sensor panel with a plurality of thin film transistors and thin film sensors having a-Si (amorphous silicon) two-dimensionally arrayed in the form of a matrix on an insulating substrate, and a wavelength converter such as scintillator arranged on the surface of the large screen sensor panel can be easily designed as a radiation detecting device having the desired S/N ratio by relating a time constant τ obtained by multiplying the capacity C of the sensor by the ON resistance R of the thin film transistor, the read rate, S/N, and the attenuation characteristics of the wavelength converter such as the scintillator to the timing of irradiation.

The present invention will hereinafter be described in details with reference to the drawings.

[First Embodiment]

Figure 2:
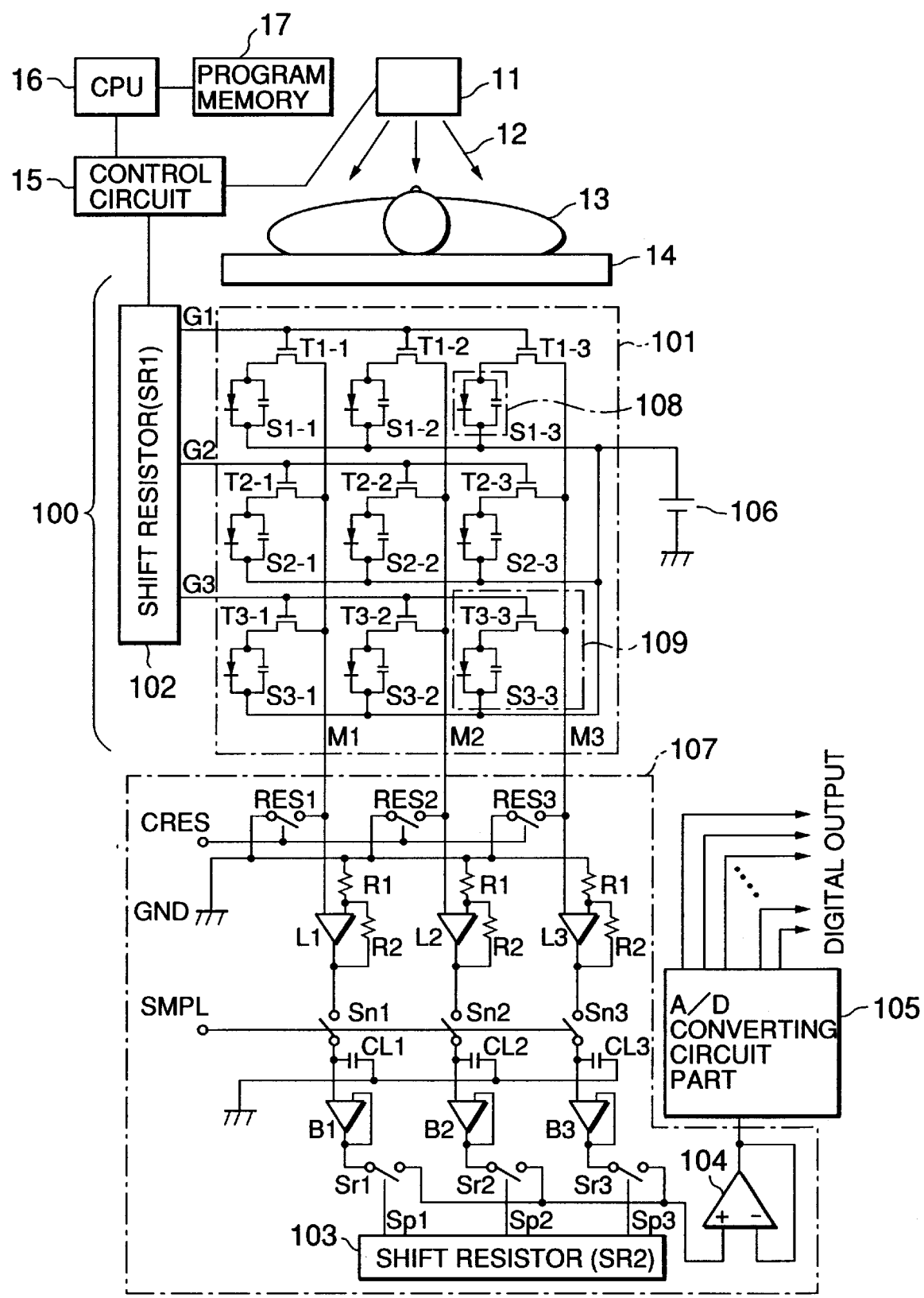
FIG. 2 is a schematic circuit diagram illustrating an example of the schematic construction of a radiation detecting device.

FIG. 2 is a schematic circuit diagram centering on a radiation detecting device 100 for describing this embodiment. In FIG. 2, a relationship between a subject 13 and a scintillator 14 or the like is schematically illustrated.

As illustrated in FIG. 2, the radiation detecting device according to this embodiment has a scintillator 14 as a wavelength converter which converts radiation 12 into photoelectrically convertible light, and pixels 109 arranged in the form of a matrix which pixels comprises sensor elements S1-1 to S3-3 for converting the light into an electric signal, a unit of which sensor element is represented by numeral 108 in FIG. 2, and TFTs (thin film transistors) T1-1 to T3-3 for transfer, which are connected to the respective pixels to successively transfer signals from the pixels.

In this embodiment, in order to obtain a desired signal to noise ratio SN, the detecting device further comprises a means (a shift resistor 102 in FIG. 2) to turn on the TFT to be turned on first among the TFTs T1-1 to T3-3 for transfer after causing delay by means (for example, a control circuit 15, a CPU 16 and a program memory 17 in FIG. 2) for delaying for at least (n×$\tau_1$), wherein $\tau_1$ is a time constant of the afterglow characteristics of a luminescent screen of the scintillator 14, and n is ln(SN), after the irradiation with the radiation 12 is stopped, thereby transferring a signal stored in its corresponding pixel.

The radiation detecting device 100 comprises the scintillator 14 which converts the radiation 12 into visible light, a photoelectric conversion part 101 in which pixels comprised of the thin film sensor elements S1-1 to S3-3 having a-Si as a semiconductor layer for receiving the visible light and converting into an electric signal and the thin film transistors (TFTs for transfer) T1-1 to T3-3 having a-Si as a semiconductor layer for transferring the signal charges photoelectrically converted by the thin film sensor elements S1-1 to S3-3 on the side of matrix signal wirings M1 to M3 are two-dimensionally arrayed in the form of a matrix, and a shift resistor 102 for driving the gate lines G1 to G3 of the thin film transistor T1-1 to T3-3. In this embodiment, the pixels are illustrated in a 3×3 matrix for the sake of brief description.

A capacitance 3 times as much as the interelectrode capacitance (Cgs) of the thin film transistor is added to the matrix signal wiring M1 upon transfer. However, in FIG. 2, it is not indicated as a capacitor element. The same shall apply to the other matrix signal wirings M2 and M3. The photoelectric conversion circuit part 101 in FIG. 2 comprised the thin film sensor elements (hereinafter also referred to as "photoelectric conversion elements") S1-1 to S3-3, the thin film transistor (hereinafter also referred to as "switching elements") T1-1 to T3-3, the gate driving wirings G1 to G3 and the matrix signal wirings M1 to M3. These can be arranged on an insulating substrate not illustrated. The shift resistor (SR1) 102 serves as a driving circuit part for switching on or off the switching elements T1-1 to T3-3.

Reference characters L1 to L3 indicate operational amplifiers for amplifying and impedance-converting the signal charges from the matrix signal wirings M1 to M3. In FIG. 2, they are illustrated as buffer amplifiers forming a voltage follower circuit. Reference characters Sn1 to Sn3 designate transfer switches for reading out the outputs from the operational amplifiers L1 to L3, i.e., the outputs from the respective matrix signal wiring M1 to M3 and transferring them to capacitors CL1 to CL3. The read capacitors CL1 to CL3 are read out by the reading switches Sr1 to Sr3 through buffer amplifiers B1 to B3 forming a voltage follower circuit.

Reference numeral 103 designates a shift resistor (SR2) for switching on or off the reading switches Sr1 to Sr3. The parallel signals from the read capacitor CL1 to CL3 are converted into a serial signal by the reading switches Sr1 to Sr3 and the shift resistor (SR2) 103, inputted into an operational amplifier 104 comprising a final voltage follower circuit and further digitized in an A/D converting circuit part 105. Reference characters RES1 to RES3 indicate resetting switches for resetting the signal components stored in the respective capacitors (3 Cgs) added to the matrix signal wirings M1 to M3, and the signal components are reset to a desired reset potential (reset to a ground potential of GND in FIG. 2) by a pulse from a CRES terminal.

Reference numeral 106 indicates a power source for applying a bias to the photoelectric conversion elements S1-1 to S3-3. A reading circuit part 107 comprises the buffer amplifiers L1 to L3, the transfer switches Sn1 to Sn3, the read capacitors CL1 to CL3, the buffer amplifiers B1 to B3, the reading switches Sr1 to Sr3, the shift resistor SR2, the final operational amplifier 104, and the resetting switches RES1 to RES3. In the figure, a symbol "SMPL" denotes a SMPL terminal for SMPL pulses.

Figure 3A:
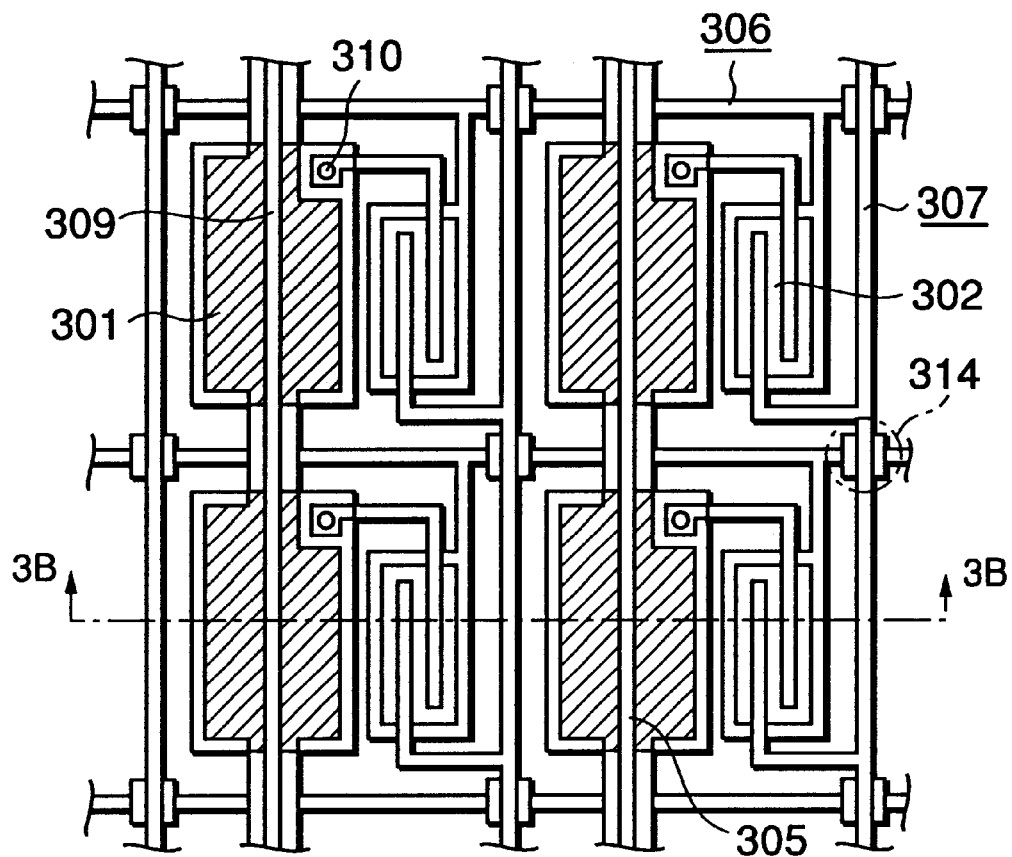
FIG. 3A is a schematic plan view illustrating an example of a photoelectric conversion circuit part.
Figure 3B:
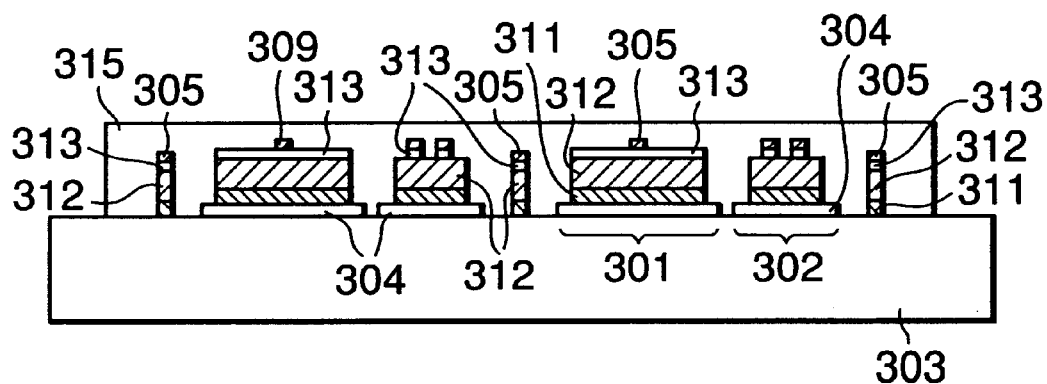
FIG. 3B is a schematic cross-sectional view taken on line 3B—3B of FIG. 3A.
Figure 4:
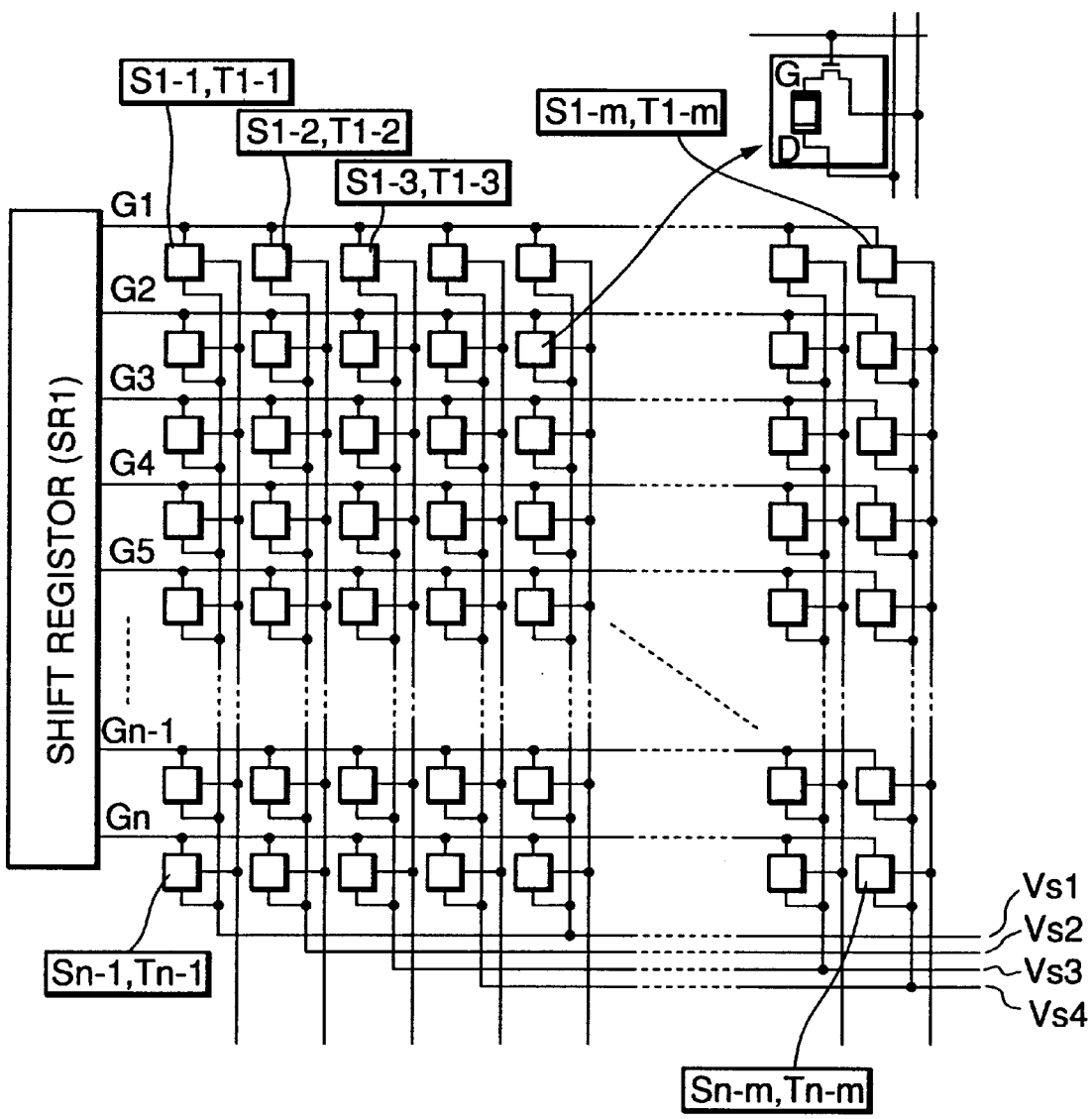
FIG. 4 is a schematic circuit diagram illustrating an example of a photoelectric conversion part.

FIG. 3A is a schematic plan view illustrating an example of a photoelectric conversion circuit part in which photoelectric conversion elements and switching elements are fabricated using a thin amorphous silicon semiconductor film 312. FIG. 3B is a schematic cross-sectional view taken on line 3B—3B of FIG. 3A. Thin film sensor elements 301 and thin film transistors (amorphous silicon TFT; hereinafter referred to as "TFT" merely) 302 are formed in the same glass substrate 303. The lower electrode of each thin film sensor element 301 and the lower electrode (gate electrode) of each TFT 302 are formed by the same first thin metal layer 304. The upper electrodes 305, 309 of the thin sensor elements 301 and the upper electrodes (source and drain electrodes) of the TFTs 302 are formed by the same second thin metal layer. The first and second thin metal layers also form gate driving wirings 306 and matrix signal wirings 307 in the photoelectric conversion circuit part. In FIG. 3A, 4 pixels in total of 2×2 are illustrated. In FIG. 3A, a hatched area indicates a light-receiving face of the thin film sensor element. The upper electrodes 305, 309 are power supply lines for applying a bias to the respective thin film sensor elements. Reference numeral 310 indicates a contact hole for connecting the thin film sensor element 301 to the TFT 302.

The thin film sensor element 301 has the same MIS structure in section as the TFT 302. The insulating films 311 of the thin sensor element 301 and the TFT 302 are composed of an insulating film formed in common. A crossing area 314 of the gate driving wiring 306 and the matrix signal wiring 307 has an insulating film 311, a thin amorphous silicon semiconductor film 312 and an ohmic conduct layer (n+ layer) 313 between their wirings. Numeral 315 denotes an insulating layer of, for example, silicon nitride (SiN) film as a protecting film, which is formed after forming thin film sensor element 301 and TFT 302.

FIG. 4 is an equivalent circuit diagram to the photoelectric conversion circuit part in FIG. 2. A pixel comprised of the thin film sensor element and TFT is indicated by a square for the sake of convenience.

A bias line through which a bias is applied to the respective thin film sensor elements is divided into 4 systems (Vs1 to Vs4), and the reset of the sensor can be conducted separately in the 4 systems.

FIG. 4 illustrates an example where the pixels are arrayed in an n×m matrix. Since the sensor bias is divided into 4 systems, the number m of columns is a multiple of 4.

Figure 5:
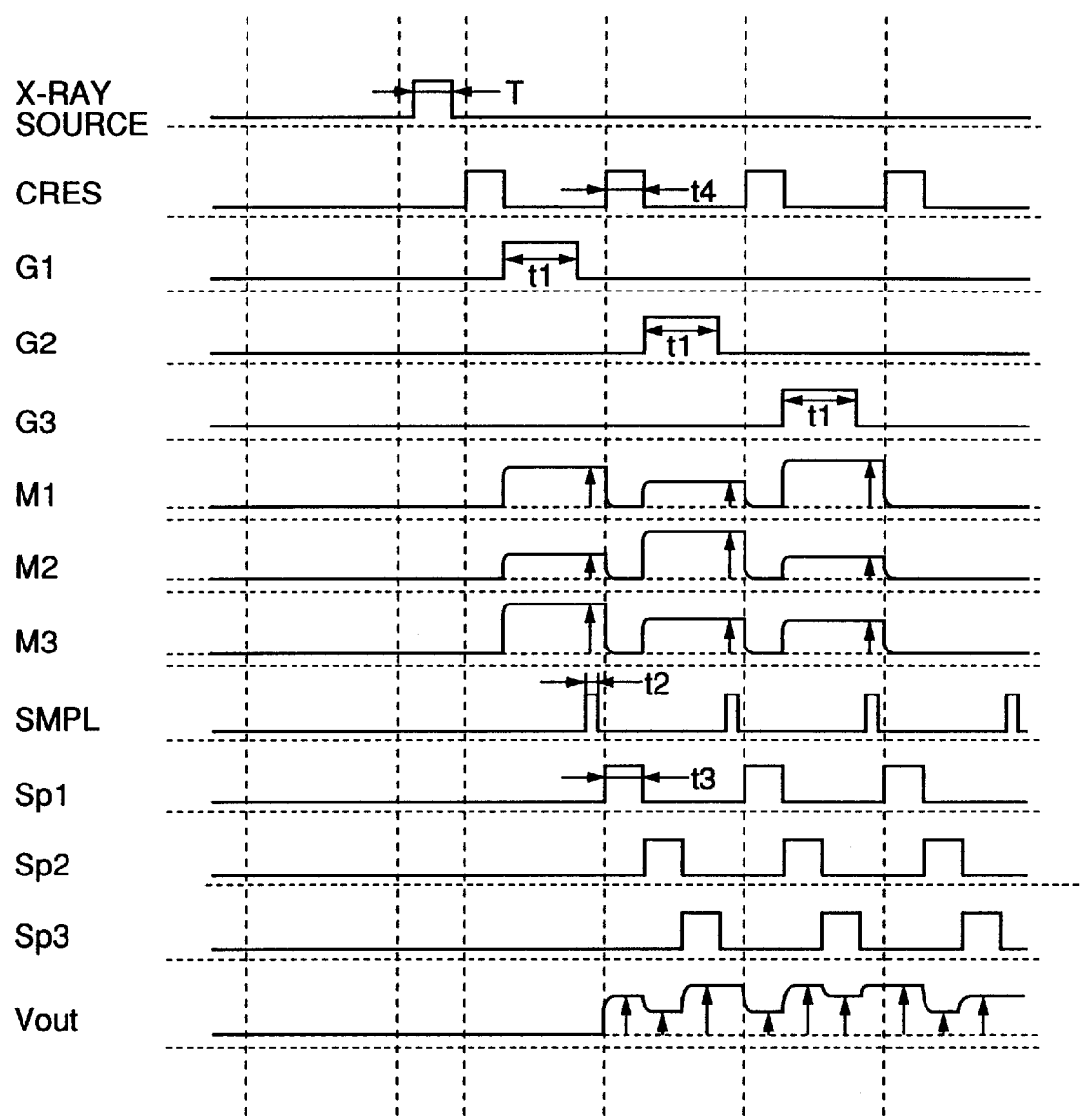
FIG. 5 is a timing chart illustrating an example of the reading operation timing of a radiation detecting device.

The operation of the radiation detecting device according to the first embodiment will now be described. FIG. 5 is a timing chart illustrating an example of the operation of the radiation detecting device as shown in FIG. 2 upon radio-photographing. The operation will be described in detail with reference to the drawing.

Charges remaining in the wirings M1, M2 and M3 after irradiation only for the time T by an X-ray source 11 are removed by turning on the CRES terminal and the transistors RES1 to RES3, thereby rendering the wirings M1, M2, M3 a ground potential.

The X-ray 12 emitted from the X-ray source 11 and transmitted by subject 13 such as a structure or human body enters the scintillator 14, thereby causing the scintillator to emit light according to the quantity of the X-ray transmitted.

The light emitted from the scintillator 14 enters the respective photoelectric conversion elements S1-1, S1-2, . . . to S3-3 in the radiation detecting device 100, and signal charges according to the quantity of the light incident on the respective photoelectric conversion elements S1-1 to S3-3 are generated.

The signal charges are stored only for a certain period of time in capacitor components formed in the photoelectric conversion elements S1-1 to S3-3. The signal charges stored in the photoelectric conversion elements S1-1 to S1-3 of the first line are transferred to capacitor components (capacitance 3 times as much as the Cgs of the switching elements T1-1 to T3-3) respectively formed in the matrix signal wirings M1 to M3 by turning on the switching elements T1-1 to T1-3 only for the time t1 according to a gate pulse signal G1 from the shift resistor (SR1) 102. In FIG. 5, M1 to M3 indicate the transfer where the quantities of the signals stored in the respective photoelectric conversion elements vary. More specifically, in the photoelectric conversion elements S1-1 to S1-3 of the first line, the output level is as follows: S1-2>S1-1>S1-3. The signal outputs from the matrix signal wirings M1 to M3 are amplified by the operational amplifiers L1 to L3, respectively.

Thereafter, the switching elements Sn1 to Sn3 within the reading circuit part are turned on only for the time t2 according to an SMPL pulse illustrated in FIG. 5, whereby the signals are transferred to the read capacitor CL1 to CL3, respectively. The signals in the read capacitor CL1 to CL3 are impedance-converted by the buffer amplifiers B1 to B3, respectively. Thereafter, the reading switches Sr1 to Sr3 are successively turned on according to shift pulses Sp1 to Sp3 from the shift resistor (SR2) 103, whereby the parallel signal charges transferred to the read capacitors CL1 to CL3 are converted into a serial signal and read out. Assuming that pulse widths of the shift pulses Sp1, Sp2 and Sp3 are equal to one another and t3 (i.e., Sp1=Sp2=Sp3=t3), the time required for the serial conversion and reading amounts to t3×3. The signal serially converted is outputted from the final operational amplifier 104 and further digitized by the A/D converting circuit part 105.

Vout illustrated in FIG. 5 indicates an analog signal before being inputted into the A/D converting circuit part 105. As illustrated in FIG. 5, the parallel signals from the S1-1 to S1-3 of the first line, i.e., the parallel signals of the signal potentials of the matrix signal wirings M1 to M3 are serially converted on the Vout signal in proportion to the levels thereof.

Finally, the signal potentials of the matrix signal wirings M1 to M3 are reset to a certain reset potential (ground potential) through the respective resetting switches RES1 to RES3 by turning on the CRES terminal only for the time t4 to apply a CRES pulse, thereby providing for the next transfer of signal charges from the photoelectric conversion elements S2-1 to S2-3 of the second line. After this, the photoelectrically converted signals of the second and third lines are read out repeatedly in the same manner as in the first line.

Figure 6:
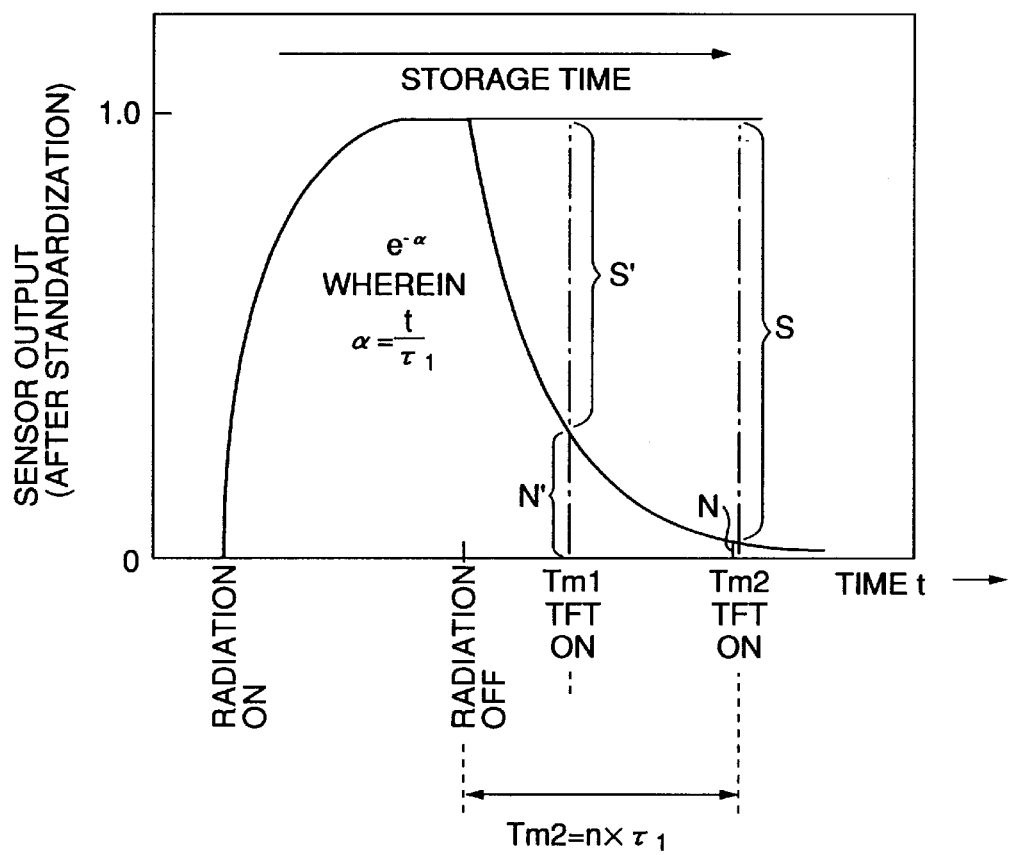
FIG. 6 diagrammatically illustrates an example of the signal to noise ratio of sensor output.

At this time, the sensors store signals until the gate voltages (G1 to G3) of the TFTs are turned on. Accordingly, there is a deviation between the time that G1 first turned on for transferring a sensor signal is turned on and the time that G3 last turned on is turned on, so that the influence of the attenuation of light emission of the scintillator varies every line. This will be described with reference to FIG. 6. FIG. 6 diagrammatically illustrates how sensor output varies after stopping the irradiation.

In FIG. 6, an attenuation component is regarded as a signal component S as illustrated in the drawing, since the attenuation component is considered to be stored as a signal component in an area in which the sensor output is attenuated on an axis of ordinate. For example, when the TFTs for transfer are turned on upon the elapsed time of Tm1 after turning off the radiation to read out the signal charges stored, an S' component already stored can be read out as a signal. However, an N' component generated on and after the Tm1 is left as a remaining component which may not be transferred, because it is not yet stored. Accordingly, this remaining component may be said to be another noise component N' than the signal component.

Namely, the sensors of a line that the gates of the TFTs for transfer are earlier turned on after turning off the radiation start transfer in a shorter storage time after stopping the irradiation. Therefore, their signal to noise ratio (S'/N') is low. On the other hand, the signal to noise ratio (S/N) of the sensors of a line that the gate is turned on later (for example, at Tm2) is high. Therefore, the signal to noise ratio varies with the line, resulting in the fact that the signal to noise ratio as the system is reduced.

However, a signal to noise ratio (SN) required as a system can be obtained by presetting the time corresponding to the signal to noise ratio (SN) required as the system to the time constant $\tau_1$ of attenuation of the scintillator up to the time the gate voltage of the TFTs for transfer is turned on.

Assuming that the quantity of light emitted by the scintillator right before stopping the irradiation is 1, the quantity of light emitted by the scintillator upon the elapsed time of $n \times \tau_1$ after stopping the irradiation amounts to $\exp(-n \times \tau_1)$. Accordingly, $1/SN = \exp(-n)$ and $\ln(SN) = n$ can be set for the SN required as the system.

Accordingly, the desired SN can be obtained by presetting the time until the TFTs for transfer are first turned on for reading out a sensor signal after stopping the irradiation to $Tm2 = n \times \tau_1$ or longer as illustrated in FIG. 6.

The means in this embodiment for causing delay of at least $n \times \tau_1$ will be now described in brief.

As means for controlling the delay time until the TFTs for transfer are first turned on to at least $N \times \tau 1$, there are means in which a control program is driven by, for example, a microcomputer (CPU) to start counting at the time the irradiation by the radiation source 11 is completed, taking the circuit illustrated in FIG. 2 as an example, and the G1 output of the shift resistor SR1 is driven after delay of at least $n \times \tau_1$, and the like. Thus, this control can be easily carried out by the conventional techniques.

It may also be easily carried out by providing a synchronizing signal line and a delay circuit between the shift resistor SR1 and the radiation source 11 to delay a completion signal of the irradiation from the radiation source 11 in the delay circuit and then input it as a start signal for the shift resistor.

[Second Embodiment]

In this embodiment, an example where a desired SN is obtained in the case where many frame images are continuously read out to form a moving image will be described.

Although the pixels of the radiation detecting device in the photoelectric conversion circuit part in FIG. 2 are arranged in a 3×3 matrix, a case where pixels are formed in an m (line)×n (column) matrix will be described in this embodiment. In this case, it is general to read out a sensor array at 30 frames per second. At this time, a scanning time per frame is 1/30 (sec), i.e., 33 msec.

Figure 7A:
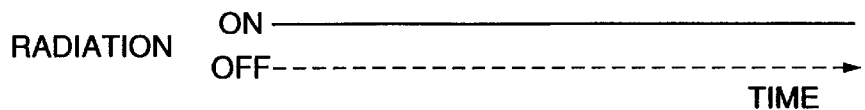
FIGS. 7A, 7B, 7C, 7D and 7E are timing charts illustrating an example of reading operation timing upon reading out a moving image.

FIGS. 7A to 7E are timing charts illustrating an example of timing upon reading out a moving radiation image. As illustrated in FIG. 7A, the irradiation is continuously conducted.

Figure 7B:
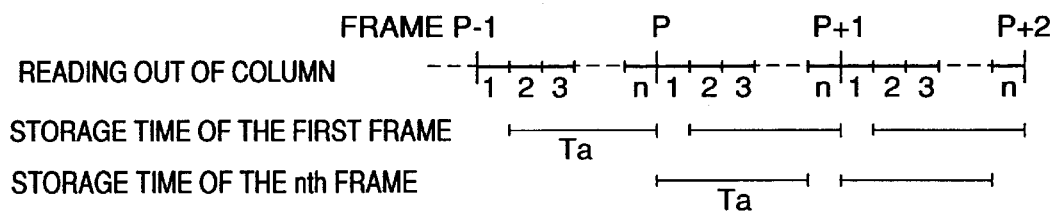

FIG. 7B illustrates the case where reading or storage of signals is continuously conducted.

Figure 7C:
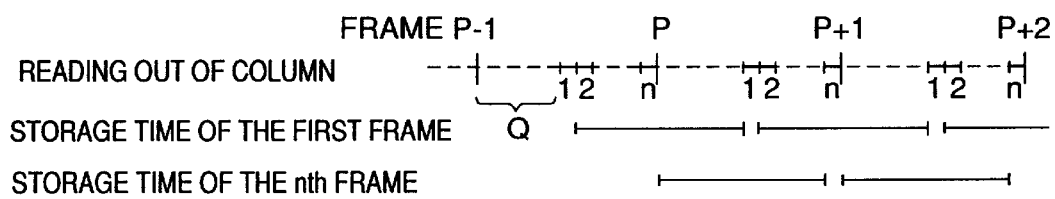

FIG. 7C illustrates the case where after the whole array is read out, a quiescent time Q is provided before the next reading is started (indicated by a broken line in the drawing). The quiescent time can be preset to at most $t_f - t_x \cdot q$ wherein $t_f$ is a scanning time per frame, $t_x$ is a read time per column, and q is the number of columns read ($\leq n$).

Figure 7D:
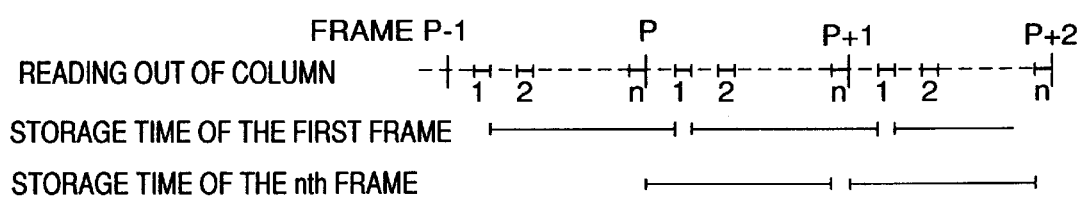

FIG. 7D illustrates the case where each column is read out at a certain timing, but a quiescent time is provided between reading times of the respective columns (while storage is being conducted).

Figure 7E:
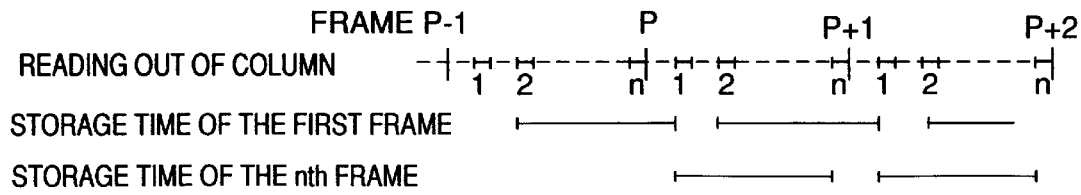

FIG. 7E illustrates the case where a quiescent time is provided between reading times of the respective columns like the case in FIG. 7D. However, during this quiescent time, storage is also not conducted in each column. An S/N ratio can be further enhanced by, for example, conducting (refreshing) drive that a remaining component after discharged (charged) from the sensor is removed.

Essential parameters relating to reading in a system including a radiation detector include the following four parameters:

(1) SN required of the system;
(2) CR time constant $\tau_2$ according to a sensor and a switch in each pixel;
(3) scanning speed (the number of frames) required of the device; and
(4) time constant $\tau_1$ of light emission of a scintillator as to build up upon exposure to an X-ray and attenuation after the exposure to the X-ray.

The parameters (1) to (4) will be described in more detail.

(1) The SN of a signal from a sensor panel is defined by the quantity S of a signal transferred through a switch and the quantity N of a signal left after the transfer.

(2) The CR time constant $\tau_2$ is a value obtained by multiplying a storage capacity C of the sensor by an ON resistance R of the switch (TFT) in each pixel.

(3) The scanning speed (the number of frames) is the number of scanning operations (the number of frames) of n columns (q<n columns as needed) per second. In the normal monitor, it is 30 frames/sec.

(4) The build up of light emission of a scintillator upon exposure to the radiation and the attenuation of light emission of the scintillator after the exposure to the radiation show a multiple-exponential ($\Sigma \alpha t^n$) change. However, it is defined as being expressed by an exponential function according to the time constant $\tau_1$ in the present invention.

Figure 8:
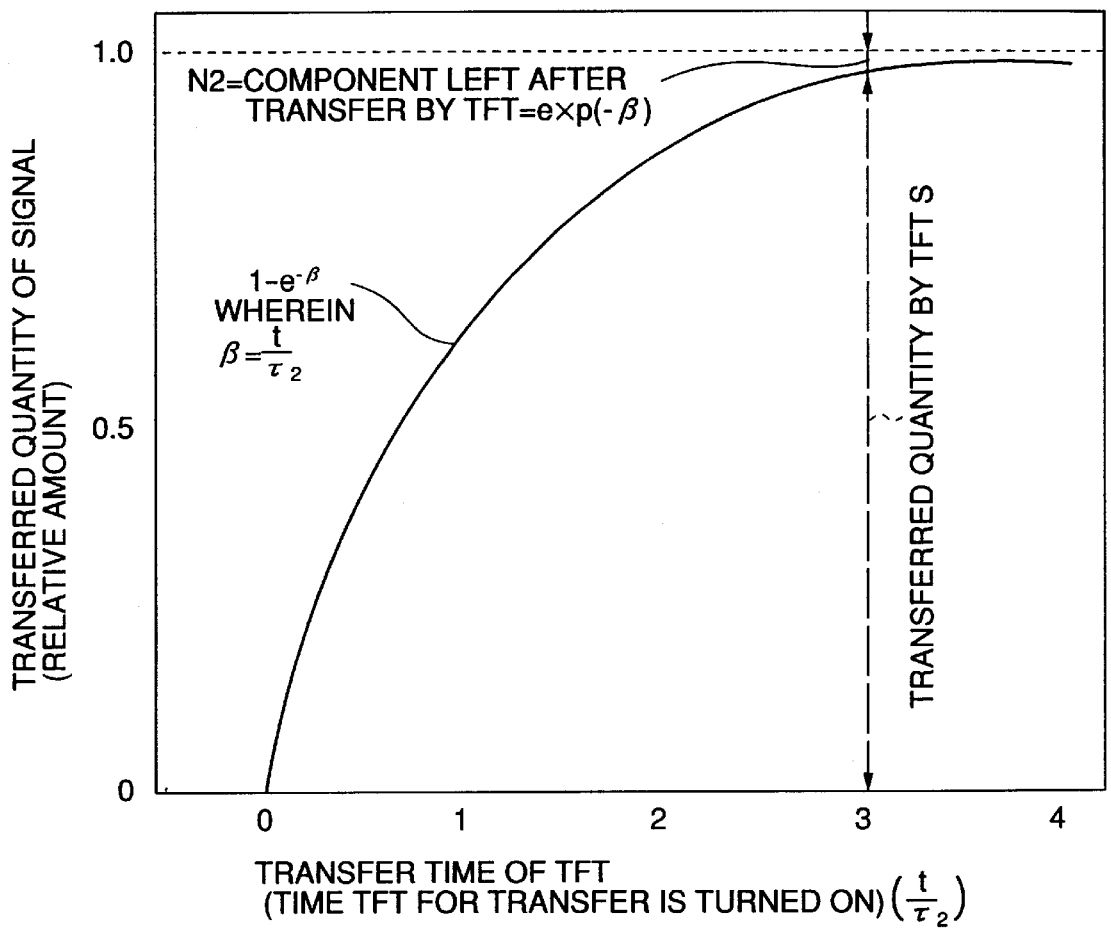
FIG. 8 diagrammatically illustrates an example of the relationship between the transfer time of TFT and the quantity of signals transferred.

FIG. 8 diagrammatically illustrates an example of the relationship between the transfer time of TFT, and the quantities of signals transferred and signals left after the transfer, and shows the transferred quantity in the case where signal charges stored in capacitors within the photoelectric conversion elements (S1-1 to S3-3 in FIG. 2 by way of example) are defined as 1. Consideration is given as to the above parameters with reference to FIG. 8.

When transfer is conducted $\beta$ times as much as the time constant $\tau_2$ (wherein $\beta=t/\tau_2$), the transferred quantity of the signal component S may be expressed by $S=1-\exp(-\beta)$ as illustrated in FIG. 8 when the parameter (1) is combined with the parameter (2). The component $N_2$ left after the transfer is expressed by $N_2=\exp(-\beta)$ as illustrated in FIG. 8. When the transferred signal component is defined as S, S comes to $1-N_2=1-\exp(-\beta)$. Since $\exp(-\beta)<<1$, S may be said to be nearly equal to 1 when standardized.

On the other hand, since $SN_2=S/N_2$, $SN_2$ may be expressed by $S/N_2=1/\exp(-\beta)$. Accordingly, the reciprocal of $SN_2$ comes to $1/SN_2=\exp(-\beta)=N_2$. Namely, the component $N_2$ left after the transfer becomes a reciprocal of $SN_2$, or $\beta$ is equal to $\ln SN_2$.

The scattering of output based on the parameter (4) will now be considered with reference to FIG. 6.

1) The output S of a scintillator having a time constant $\tau_1$ of light emission after the time t from light emission according to the build up of the light emission is expressed by $S=S_0\cdot(1-\exp(-\alpha))$ wherein $S_0$ is a sensor output when saturated, and $\alpha$ is $t/\tau_1$.

2) The change in output due to the delay of attenuation of light emission of the scintillator is expressed by $S=S_0\cdot\exp(-\alpha)$.

When the time constant of build up and attenuation of the scintillator is 0, namely, a change is caused momentarily, there is no noise. However, since the scintillator has the time constant $\tau_1$, a noise component occurs in a proportion of $\exp(-\alpha)$. At this time, the output S may be said to be nearly equal to 1. In actual reading, the storage time is almost a reciprocal of the number of frames. When the number of frames is 30 frames/sec by way of example, the storage time is 33 msec. Therefore, good approximation is achieved when the time constant of the scintillator is on the order of milliseconds.

Namely, $1/SN_1=\exp(-\alpha)$ is satisfied for $SN_1$ required.

SN required from the outside as the system becomes a synthetic SN of $SN_2=\exp(-\beta)$ come about from the time constant of the TFT and $SN_1=\exp(\alpha)$ come about from the time constant of the scintillator.

A reciprocal of this synthetic SN can be set to $1/SN=\exp(-\alpha-\beta)$.

The time of the TFT for transferring a sensor signal is $\beta\times\tau_2$, and the time during which light from the scintillator is received by the sensor to store a signal therein is $\alpha\times\tau_1$. The total time of $\alpha\times\tau_1$ and $\beta\times\tau_1$ cannot exceed the time of 1 frame.

Accordingly, the following relational expression is satisfied.

$$(\alpha\times\tau_1+\beta\times\tau_2)\leq 1/FPS$$

wherein FPS is the number of frames per second upon the reading of the radiation sensor; $\tau_1$ is a time constant of build up and attenuation of light emission upon and after the irradiation of the scintillator with the radiation; $\tau_2$ is a time constant obtained by multiplying a sensor capacity by the ON resistance of the TFT; $\alpha$ is a multiple of [(storage time of the light signal in the sensor)/(the time constant of build up and attenuation of light emission of the scintillator]; and $\beta$ is a multiple of a time constant of the time the TFT for transfer is turned on.

Accordingly, when the scanning time of the sensor per frame is preset to at least $(\alpha\times\tau_1+\tau_2)$ by, for example, a control system using a microcomputer, a radiation detecting device having a desired signal to noise ratio, $SN=\ln(\alpha+\beta)$, can be obtained with ease. Incidentally, assuming that a signal to noise ratio required of the scintillator is $SN_1$, $\alpha$ may be represented by $\ln(SN_1)$, while $\beta$ may be represented by $\ln(SN_2)$ in which $SN_2$ is a signal to noise ratio required of the TFT for transferring the signal stored in the capacitor of the sensor element.

As described above, when the relationship between necessary SN and read rate is preset to the optimum also in systems of radiophotographic apparatus, radiation diagnostic apparatus and radiation therapeutic apparatus, various radiation detecting devices having a satisfactory signal to noise ratio taking the time constant of afterglow characteristics of a phosphor and the time constant come about from the thin film sensor element and the thin film transistor into consideration can be provided.

According to the present invention, radiation detecting methods and apparatus capable of conducting stable reading can also be provided.

Further, according to the present invention, radiation detecting devices and methods can be provided at lower cost because the design can be made with ease according to performance requirements.

In the present invention, the radiation is not limited to X-rays, and $\alpha$-rays, $\beta$-rays, $\gamma$-rays and the like may also be applied to the systems in which information subjected to wavelength conversion by a wavelength converter is outputted in the form of an electric signal by a photoelectric conversion element. However, it is desirable to apply the present invention to systems using X-rays, which are widely in common use. As the wavelength converter, a scintillator (or phosphor) having a time constant in wavelength conversion characteristics by the incidence of light from a light source is preferably used.

Naturally, the present invention may be suitably modified within the scope and sprit of the appended claims.

What is claimed is:

1. A radiation detecting device having a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the detecting device comprising:

a means for turning on the TFT to be turned on first among the TFTs for transfer after the delay of at least $(n\times\tau_1)$, wherein $\tau_1$ is a time constant of a characteristic of the wavelength converter, and n is $\ln(SN)$ in which SN is a desired signal to noise ratio, after the irradiation is stopped, thereby transferring a signal stored in its corresponding pixel.

2. The radiation detecting device according to claim 1, which further comprises a radiation source for emitting the radiation.

3. The radiation detecting device according to claim 2, wherein the radiation source emits radiation selected from the group consisting of $\alpha$-rays, $\beta$-rays, $\gamma$-rays and X-rays.

4. The radiation detecting device according to claim 1, wherein the wavelength converter comprises a scintillator.

5. The radiation detecting device according to claim 4, wherein the scintillator comprises a phosphor.

6. The radiation detecting device according to claim 1, wherein the wavelength converter is a scintillator, and the characteristic of the wavelength converter is an afterglow characteristic of the scintillator.

7. The radiation detecting device according to claim 6, wherein the afterglow characteristic is an attenuation characteristic of the scintillator.

8. A radiation detecting device comprising a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, wherein the detecting device satisfies the following relational expressions:

$$(\alpha \times \tau_1 + \beta \times \tau_2) \leq 1/FPS; \text{ and}$$

$$SN = exp(\alpha + \beta)$$

wherein SN is the desired signal to noise ratio of the whole device; FPS is the number of frames per second upon the reading of the radiation detecting device, or a reciprocal of the time required for a reading; $\tau_1$ is a time constant of build up and attenuation of the wavelength converter; $\tau_2$ is a time constant obtained by multiplying the capacity of the sensor element by the ON resistance of the TFT for transfer; $\alpha$ is a multiple of [(storage time of the light signal in the sensor element)/$\tau_1$], or $\ln(SN_1)$ in which $SN_1$ is a signal to noise ratio required of the wavelength converter; and $\beta$ is a multiple of a time constant of the time the TFT for transfer is turned on, or $\ln(SN_2)$ in which $SN_2$ is a signal to noise ratio required of the TFT for transferring the signal stored in the capacitor of the sensor element.

9. The radiation detecting device according to claim 8, which further comprises a radiation source for emitting the radiation.

10. The radiation detecting device according to claim 9, wherein the radiation source emits radiation selected from the group consisting of α-rays, β-rays, γ-rays and X-rays.

11. The radiation detecting device according to claim 8, wherein the wavelength converter comprises a scintillator.

12. The radiation detecting device according to claim 11, wherein the scintillator comprises a phosphor.

13. The radiation detecting device according to claim 8, wherein the wavelength converter is a scintillator, and the time constant of build up and attenuation of the wavelength converter is the time constant of build up and attenuation of the scintillator.

14. The radiation detecting device according to claim 13, wherein the time constant of build up of light emission of the scintillator is 1.

15. A radiation detecting method using a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the method comprising:

turning on the TFT to be turned on first among the TFTs for transfer after the delay of at least $(n \times \tau_1)$, wherein $\tau_1$ is a time constant of a characteristic of the wavelength converter, and n is $\ln(SN)$ in which SN is a desired signal to noise ratio, after the irradiation is stopped, thereby transferring a signal stored in its corresponding pixel.

16. The radiation detecting method according to claim 15, which further uses a radiation source for emitting the radiation.

17. The radiation detecting method according to claim 16, wherein the radiation source emits radiation selected from the group consisting of α-rays, β-rays, γ-rays and X-rays.

18. The radiation detecting method according to claim 15, wherein the wavelength converter comprises a scintillator.

19. The radiation detecting method according to claim 18, wherein the scintillator comprises a phosphor.

20. The radiation detecting method according to claim 15, wherein the wavelength converter is a scintillator, and the characteristic of the wavelength converter is an afterglow characteristic of the scintillator.

21. The radiation detecting method according to claim 20, wherein the afterglow characteristic is an attenuation characteristic of the scintillator.

22. A radiation detecting method using a wavelength converter for converting radiation into photoelectrically convertible light and a plurality of pixels arranged in the form of a matrix which pixel comprises a sensor element for converting the light into an electric signal and a thin film transistor (TFT) for transfer connected to the sensor element to successively transfer a signal from the pixel, the method comprising satisfying the following relational expressions:

$$(\alpha \times \tau_1 + \beta \times \tau_2) \leq 1/FPS; \text{ and}$$

$$SN = exp(\alpha + \beta)$$

wherein SN is the desired signal to noise ratio of the whole device; FPS is the number of frames per second upon the reading of a radiation detecting device, or a reciprocal of the time required for a reading; $\tau_1$ is a time constant of build up and attenuation of the wavelength converter; $\tau_2$ is a time constant obtained by multiplying the capacity of the sensor element by the ON resistance of the TFT for transfer; $\alpha$ is a multiple of [(storage time of the light signal in the sensor element)/$\tau_1$], or $\ln(SN_1)$ in which $SN_1$ is a signal to noise ratio required of the wavelength converter; and $\beta$ is a multiple of a time constant of the time the TFT for transfer is turned on, or $\ln(SN_2)$ in which $SN_2$ is a signal to noise ratio required of the TFT for transferring the signal stored in the capacitor of the sensor element.

23. The radiation detecting method according to claim 22, which further uses a radiation source for emitting the radiation.

24. The radiation detecting method according to claim 23, wherein the radiation source emits radiation selected from the group consisting of α-rays, β-rays, γ-rays and X-rays.

25. The radiation detecting method according to claim 22, wherein the wavelength converter comprises a scintillator.

26. The radiation detecting method according to claim 25, wherein the scintillator comprises a phosphor.

27. The radiation detecting method according to claim 22, wherein the wavelength converter is a scintillator, and the time constant of build up and attenuation of the wavelength converter is the time constant of build up and attenuation of the scintillator.

28. The radiation detecting method according to claim 27, wherein the time constant of build up of light emission of the scintillator is 1.

* * * * *

UNITED STATES PATENT AND TRADEMARK OFFICE
CERTIFICATE OF CORRECTION

PATENT NO. : 6,239,439 B1
DATED : May 29, 2001
INVENTOR(S) : Satoshi Itabashi et al.

It is certified that error appears in the above-identified patent and that said Letters Patent is hereby corrected as shown below:

Column 2,
Line 22, "panel in such" should read -- panel. --.
Line 33, "a case." should be deleted.
Line 55, "convertig" should read -- converting --.

Column 3,
Line 54, "$\beta\tau_2$)" should read -- $\beta x \tau_2$) --.

Column 6,
Line 2, "details" should read -- detail --.

Column 10,
Line 34, "charged (charged)" should read -- charge (charge) --.

Signed and Sealed this

Twenty-sixth Day of February, 2002

Attest:

Attesting Officer

JAMES E. ROGAN
Director of the United States Patent and Trademark Office